L. J. CUDAHY.
SAFETY TAP HOLDER.
APPLICATION FILED JAN. 5, 1909.
956,298.  Patented Apr. 26, 1910.
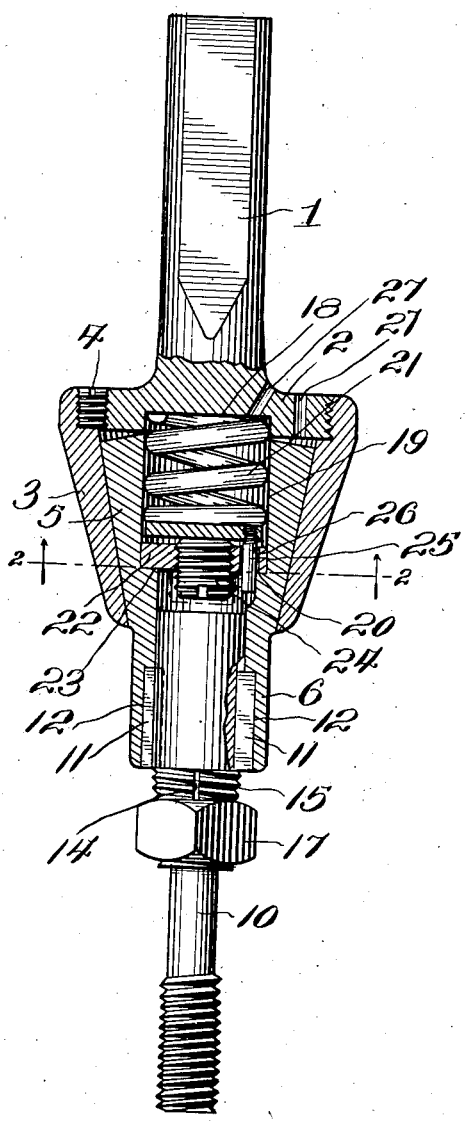
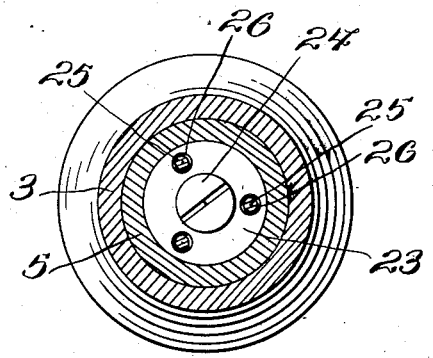
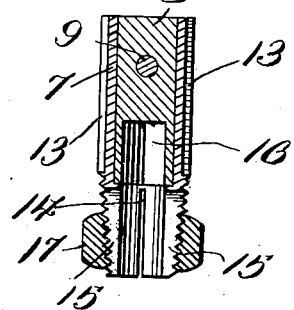
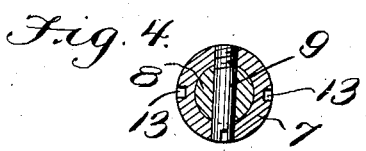
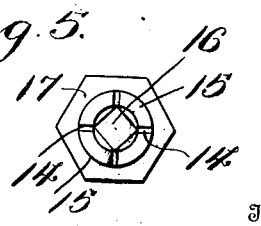
Witnesses
J. L. Wright
C. C. Hines
Inventor
Laurence J. Cudahy,
By Victor J. Evans,
Attorney

UNITED STATES PATENT OFFICE.

LAURENCE J. CUDAHY, OF MUSKEGON, MICHIGAN.

SAFETY TAP-HOLDER.

956,298.  Specification of Letters Patent.  Patented Apr. 26, 1910.

Application filed January 5, 1909. Serial No. 470,766.

*To all whom it may concern:*

Be it known that I, LAURENCE J. CUDAHY, a citizen of the United States, residing at Muskegon, in the county of Muskegon and State of Michigan, have invented new and useful Improvements in Safety Tap-Holders, of which the following is a specification.

This invention relates to a safety holder for screw taps, for connecting such taps with a drill chuck, whereby the tap may be driven to form a screw threaded bore or socket.

The object of the invention is to provide a holder which will prevent a breaking force from being thrown upon the tap, and which will automatically become inoperative to drive the tap when the force applied reaches the safety limit.

A further object is to provide a holder of this character which may be adjusted to become inoperative for driving purposes at different resistances so as to render it effective for relatively small and weak taps or taps of determined varying strengths within certain limits, and which may be so adjusted in a quick, convenient and effective manner.

With these and other objects in view, the invention consists of the features of construction, combination and arrangement of parts hereinafter fully described and claimed, reference being had to the accompanying drawing, in which:—

Figure 1 is a sectional elevation of a tap holder embodying my invention with a tap held therein. Fig. 2 is a horizontal cross-section on line 2—2 of Fig. 1. Fig. 3 is a vertical section through the tap chuck. Fig. 4 is a horizontal section thereof. Fig. 5 is an end elevation of the chuck.

Referring to the drawing, 1 designates the shank of the holder for connecting the same with a drill chuck of any ordinary construction, which shank is provided at its outer end with an externally threaded right angular flange 2. A shell or socket 3 of frusto-conical form, is internally threaded at its upper or enlarged end to receive and engage said flange, and is locked thereto from independent rotary movement by a locking screw 4. The interior surface of the shell 3 is tapered and ground smooth for frictional engagement with a tapered tool carrier head 5, which has a slight longitudinal movement therein toward and from the flange 2. The outer surface of this tapered head 5 is ground to smoothly fit the interior surface of the shell 3, and to normally bind against the same with sufficient friction to lock the two parts together. The head is formed with a cylindrical neck or extension 6 having a cylindrical bore to receive a sleeve 7, within the upper portion of which is fitted a strengthening core 8 secured thereto by a transverse pin or bolt 9. The sleeve and core form a chuck to engage and hold the tap 10, and are held in position in the neck or extension 6 of the carrier head 5 by keys 11 which engage registering longitudinal grooves 12 and 13 in said neck and sleeve. These keys hold the chuck from rotary motion, while permitting the same to be readily withdrawn when occasion requires for the substitution of a new chuck or one varying in size therefrom. The lower end of the chuck sleeve is provided with a series of equidistantly arranged slots 14 forming a series of clamping jaws 15 to engage or grip the shank of the tap 10, the angular tang of which is received within a correspondingly shaped socket 16 in the core 8. The jaws 15 are tapered and externally threaded to receive a clamping nut 17 by which they may be contracted and expanded to grip and release the tap 10.

It will be understood that the shank 1 and socket 3 form a driving element for connection with the drill chuck, while the parts 5 and 6 form a tap chuck carrier, and that the tapered surfaces of the parts 3 and 5 form a frictional clutch connection between them by which they are normally bound together to turn in unison. The frictional surfaces are normally held in engagement to lock the parts together, and it is the purpose of the invention to provide improved means for holding said parts in locking engagement, permitting independent slipping or turning motion of the driving element when the point of breaking strain is reached, and for regulating the locking action or resistance to independent movement so that the device may be effectively employed for holding small and weak taps, or taps varying to a determined extent in strength, so that breaking of the tap will be prevented.

The flange 2 is formed in its underside with a central socket 18 and the tapered head 5 is provided with a bore 19 of greater diameter than the bore of the sleeve and opening at its upper end through said head, a bearing shoulder 20 being formed at the lower or outer end of said bore 19 by reason of the greater diameter of said bore than the communicating bore of the neck. A coiled or spiral spring 21 seats at its upper end within the bore 18 and is mainly confined in the bore 19, and bears at its upper end against the flange 2 and at its lower end against a follower 22 in the socket 19, by which the expansive pressure of the spring is exerted to force the tapered head 5 outward and cause it to bind against the tapered wall of the sleeve 3. A disk or head 23 is arranged in the base of the socket 19 and bears on the shoulder 20 and carries an adjusting screw 24 which bears on the follower 22, and by the adjustment of which the tension or acting pressure of the spring 21 on the head 5 may be regulated. Guide pins 25 are suitably fixed to the follower 22 and slide vertically in guide openings 26 in the head or disk 23, by which rotary movement of the follower is prevented. Openings 27 are formed in the flange 2 for the introduction of oil or other lubricant to prevent excessive friction and to secure an easy independent rotary movement of the driving element on the chuck carrier when the breaking strain is reached.

The tap holder as thus constructed is adapted to permit of an independent slipping motion of the driving element before a breaking strain or force is applied to the tap. As a holder of this character should be designed for use in connection with several sizes of taps and as each size of tap requires a certain degree of force or tension to drive it to the safety limit, adjustment should be provided for holding the parts connected until the safety breaking limit is reached.

It will be understood that in the operation of the device, the spring 21 normally forces the head 5 outward and into frictional engagement with the shell 3, thus forming a clutch connection between them, by which the motion of the drill chuck applied to the driving element will be transmitted to the chuck carrier and the tap held thereby. This clutch connection will be maintained until the maximum force or pressure which the tap is designed to withstand is reached, and the resistance of the tap to further movement is sufficient to overcome the pressure of the spring 21, which has been previously adjusted to yield at the safety limit, when the carrier will be held stationary under the resistance of the tap, thus permitting the driving element to slip or partially rotate thereon. This operation prevents breaking of the tap and indicates to the operator that the limit of safety driving action of the tap has been reached. By this means the application of a greater amount of driving force to the tap than the latter is designed to withstand under the resistance which it encounters will be prevented. The acting pressure of the spring may be regulated by adjustment of the screw 24, so as to regulate the binding action of the clutch members to accord with the strength of the tap. This screw may be conveniently reached by simply withdrawing the chuck whenever a tap of a different size or strength is to be substituted for the one previously used. If desired, however, the screw may also be placed above the tension spring, and means provided for regulating the binding action between the clutch members, without removing the tap chuck.

From the foregoing description, the construction and mode of operation of my improved tap holder will be readily understood, and it will be seen that it provides a holder which will in a simple and effective manner prevent an excessive driving force from being applied to the tap, and which is adjustable to various resistances to suit different sizes or strengths of taps.

Having thus fully described the invention, what is claimed as new is:—

1. A tap holder comprising a driving element embodying a conical shell having a tapered friction surface, a chuck carrier having a hollow conical head inclosed within said shell and provided with a cylindrical chuck receiving extension and with an externally tapered friction surface to engage said friction surface of the shell, a spring inclosed within the head and bearing against the shell, and means exposed through said cylindrical extension for regulating the tension of said spring.

2. A tap holder comprising a driving shank having a flanged end, a conical shell detachably engaging said flanged end of the shank and provided with a tapered interior friction surface, a hollow conical head inclosed within said shell and provided with a coöperating friction surface, said head also being formed with a socket and an extension projecting from the shell and provided with a bore in line with said socket, a spring arranged in said socket and bearing at one end against the flanged end of the shank, a follower in the socket bearing against the other end of the spring, and an adjusting device engaging said follower and exposed through said bore in the extension.

3. A tap holder comprising a driving shank having a flanged end, a conical shell detachably connected with said flanged end and provided with a tapered interior friction surface, a hollow head within the shell provided with a coöperating friction surface, said head being formed with a socket and an extension projecting beyond the shell, said extension being provided with a chuck receiving bore communicating with said socket and of less diameter than the same to provide an intervening shoulder, a spring within the socket bearing at one end against the flanged end of the shank, a disk arranged to bear against said shoulder, a follower connecting upon the opposite end of the spring, and an adjusting screw carried by the disk and bearing on the follower and exposed through said receiving bore.

In testimony whereof I affix my signature in presence of two witnesses.

LAURENCE J. CUDAHY.

Witnesses:
F. E. HUDDLESTON,
FRANK MCGUIRK.